United States Patent
Bedford

[15] 3,679,953
[45] July 25, 1972

[54] COMPATIBLE BRUSHLESS RELUCTANCE MOTORS AND CONTROLLED SWITCH CIRCUITS

[72] Inventor: Burnice D. Bedford, Scotia, N.Y.
[73] Assignee: General Electric Company
[22] Filed: Nov. 6, 1970
[21] Appl. No.: 87,565

[52] U.S. Cl. ........................... 318/138, 318/138, 318/166, 318/254
[51] Int. Cl. ....................................... H02k 29/00
[58] Field of Search ................. 318/138, 166, 254, 685, 696

[56] References Cited

UNITED STATES PATENTS

| | | |
|---|---|---|
| 3,374,410 | 3/1968 | Cronquist ........................... 318/138 |
| 3,127,548 | 3/1964 | Van Emden ......................... 318/138 |
| 3,486,096 | 12/1969 | Van Cleave ......................... 318/138 |
| 3,530,347 | 9/1970 | Newell ................................ 318/138 |

*Primary Examiner*—Gene Z. Rubinson
*Attorney*—Paul A. Frank, John F. Ahern, Julius J. Zaskalicky, Donald R. Campbell, Frank L. Neuhauser, Oscar B. Waddell and Joseph B. Forman

[57] ABSTRACT

Brushless reluctance motors are compatible with energization by the simple rectilinear voltages easily produced by motor control circuits having a small number of mechanical or solid state switches. These motors with two or three opposing pairs of main and feedback stator windings, and suitable variable or constant gap nonpolarized rotors, require a like number of controlled switches and uncontrolled rectifiers actuated by a rotor position sensor to generate square wave voltages on which the reluctance motors operate efficiently.

11 Claims, 8 Drawing Figures

PATENTED JUL 25 1972 3,679,953

Inventor:
Burnice D. Bedford,
by Donald R. Campbell
His Attorney.

Inventor:
Burnice D. Bedford,
by Donald R. Campbell
His Attorney.

COMPATIBLE BRUSHLESS RELUCTANCE MOTORS AND CONTROLLED SWITCH CIRCUITS

This invention relates to brushless reluctance electric motors energized from a direct current supply, and more particularly to brushless motors designed for efficient operation by motor control circuits using a few controlled switches that produce simple rectilinear voltage wave shapes. These brushless motors are suitable for adjustable speed operation.

In the brushless or commutatorless direct current motor, the drive coils carrying the magnetizing current which results in the production of torque are located on the stator housing, rather than on the movable rotor as in the conventional direct current motor. The rotor in a brushless motor is commonly a permanent magnet rotor, and the circuit energizing the drive coils uses controlled switches to control the flow of current in the drive coils in a sequence to produce continuous rotation of the rotor. Consequently, the commutators and brushes utilized on the conventional motor to supply current to the armature windings are eliminated, together with such undesirable features as for example the need to replace brushes, arcing between commutator segments, and repair of worn commutator segments. In order to reduce the cost of the control circuit, and thus minimize the cost of the combination of the brushless motor and control circuit, it is advantageous to choose a circuit that requires only a few controlled on-off switches, preferably solid-state switches such as transistors or silicon controlled rectifiers. These simple control circuits, however, produce only square or stepped voltage wave shapes, and the particular rectilinear wave shape that is generated depends on the circuit configuration, the number of switches, and the sequence and timing of the closing of the switches. A particular brushless motor that operates satisfactorily with one of these voltage wave shapes will not operate as well with another simple wave shape. Although brushless motors operated by motor control circuits comprising only a few controlled switches have appeared in the prior art, there is inadequate recognition in the prior art of the motor design needed to operate efficiently with a particular square or stepped voltage wave shape that can be produced by an inexpensive control circuit. The alternative approach of using a conventional motor design and modifying the motor control circuit to produce a more complex voltage wave shape to meet the more severe motor requirements frequently results in a higher cost for the combined motor and control circuit.

As will be further described in this application, details of the impressed voltage and back electromotive force voltage are not critical in a reluctance motor, and such a motor is suitable to be energized by an extremely simple control circuit which in the preferred embodiments of the invention comprises only two or three controlled switches. As a continuation of the general subject matter, another concurrently filed application by the same inventor assigned to the same assignee, Ser. No. 87,484, filed Nov. 6, 1970 discloses and claims other motor control circuits with up to six controlled switches that easily produce other square and stepped voltage wave shapes, together with an appropriate design of a permanent magnet or variable reluctance brushless motor having a similar back emf wave shape, whereby efficient motor operation is assured.

Therefore, an object of the invention is the improved combination of a brushless or commutatorless electric motor and a simple motor control circuit employing only a few controlled switches to produce rectilinear wave shapes, wherein the brushless motor is designed to operate efficiently on the voltage and current wave shapes produced by the particular control circuit.

Another object is the provision of a family of compatible brushless reluctance motor and motor control circuits employing a small number of mechanical or solid-state controlled switches that are useful in a variety of small or medium size motor applications.

Yet another object is to provide a brushless reluctance motor and control circuit therefor having an interrelated design such that the combination is inexpensive and suitable for adjustable speed operation.

In accordance with the invention, the combination of a compatible brushless reluctance motor and motor control circuit includes a stator member supporting a plurality of spaced sets of opposing stator windings for generating overlapping magnetic fields of opposite polarity in torque producing relation to a rotatable magnetically nonpolarized ferromagnetic rotor. Preferably each set of stator windings includes bifilar closely coupled main and feedback windings. An energizing circuit applies simple rectilinear, or substantially rectilinear, voltages of both polarities to each set of stator windings under the control of only one controlled switch device for each set. When main windings with associated feedback windings are used, the controlled switch is in series with the main windings and an uncontrolled rectifier is effectively in series with each feedback winding to discharge the stored magnetic energy in the main winding magnetic circuit. This circuit generates square wave energizing voltages. Control means responsive to the instantaneous rotor position renders conductive each controlled switch for desired intervals of conduction in a sequence to produce continuous torque to rotate the rotor in a given direction. A double spiral rotor creating a variable air gap is used in a motor with one direction of rotation, while a symmetrical four pole rotor with constant air gap is used in a reversible motor.

The foregoing and other objects, features, and advantages of the invention will be apparent from the following more particular description of several preferred embodiments of the invention as illustrated in the accompanying drawings wherein:

FIG. 1b is a schematic circuit diagram of a motor control circuit using two mechanical switches for energizing the motor of FIG. 1a;

Figure 1A:
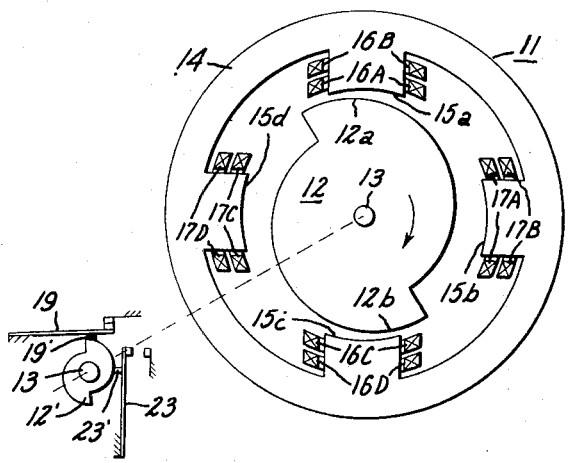
FIG. 1a is a schematic end view of a variable reluctance brushless motor having a double off-center spiral rotor, the stator winding coils being shown in cross section here and in the similar views of other motors to follow, and further including a diagrammatic representation of an extension of the motor shaft to which is attached a cam for actuating mechanical control circuit switches.

The variable reluctance brushless motor illustrated in FIG. 1a is a relatively small motor that can be used in a variety of applications requiring only one direction of rotation, such as in a small electric appliance. This motor operates efficiently on the voltage and current wave shapes produced by a motor control circuit comprising only two controlled switches and two feedback diodes. As a special feature, the motor has feedback windings which aid commutation and improve the efficiency by returning magnetic energy to the power circuit. The motor comprises in general an annular stator member 11 within which a nonsymmetrical variable reluctance rotor 12 rotates on a shaft 13. The variable reluctance rotor 12 is constructed of an appropriate ferromagnetic material such as soft iron in a shape characterized by two off-center spiral surfaces 12a and 12b, each occupying 180° and having a high point with respect to the center of the rotor that terminates at an inwardly directed shoulder connecting to the low point of the other spiral.

The stator 11 comprises an annular frame 14 provided with four inwardly directed, equally spaced salient pole structures 15a–15. A bifilar stator winding is disposed about each of the stator poles. Main windings 16A and 16C are wound respectively about the diametrically opposite stator poles 15a and 15c, and (see also FIG. 1b) are connected in series circuit relationship and wound in opposite directions so as to produce, when energized, magnetic poles of opposite polarity. Feedback windings 16B and 16D wound about the same two poles are closely coupled with the respective main windings 16A and 16C but are connected in parallel circuit relationship to effectively obtain a 2:1 turns ratio. In the same manner, bifilar windings 17A and 17B are associated with stator poles 15b, and windings 17C and 17D with stator pole 15d. In the motor control circuit, FIG. 1b, a mechanical switch 19 is connected in series with the first pair of series connected main windings 16A and 16C between direct current power supply terminals 20 and 21. A feedback diode 22 is connected in series with each of the feedback windings 16B and 16D between the pair of supply terminals. Similarly a second mechanical switch 23 is connected in series with the other pair of series connected main windings 17A and 17C, and a second feedback diode 24 is connected in series with the parallel combination of feedback windings 17B and 17D. The power source of the motor control circuit is conveniently a battery 25 across the terminals of which is connected a filter capacitor 26.

The mechanical switches 19 and 23 are closed and opened in dependence upon the position of the rotor 12 and in a sequence to obtain continuous torque in one direction. As is shown schematically in FIG. 1a, the rotor position is sensed mechanically by a small mechanical cam 12' having the same double spiral shape as the rotor 12 which is fastened to the motor shaft 13 or an extension thereof with a leading angle of orientation. Cam riders 19' and 23' are mounted at right angles to one another and actuate the respective mechanical switches 19 and 23, which can be simple spring contacts as shown or can be modern sealed switches such as the reed switch. Contacts 19 and 23 are opened and closed twice during each revolution of rotor 12, mechanically displaced by exactly 90° or some other selected angle. As will be explained in greater detail later, it is preferred to use solid-state switches in place of the mechanical switches 19 and 23, and to use a magnetic or optical sensor for sensing the rotor position in place of the mechanical cam 12', but the use of the mechanical equivalent in this first embodiment of the invention serves to clarify its operation.

As is well known, the principle of operation of a reluctance machine is that the torque tends to rotate the rotor so as to minimize the reluctance offered by the air gap to the magnetomotive force developed by the stator windings. Consequently, rotor 12 tends to rotate in a clockwise direction until the air gap between a pole face and the double spiral rotor 12 is at a minimum, and in order to maintain continuous torque, of course, the other set of stator windings are energized to develop the desired flux density level in advance of the rotor actually reaching the minimum air gap position. Upon applying voltage to a particular set of stator windings, small currents are induced at the adjacent surfaces of the moving rotor 12 to create a magnetic pole of opposite polarity. Since the direction of the current in the main windings cannot be changed, the polarity of the magnetic poles induced on rotor 12 by each set of opposing windings during each complete revolution changes from north to south, but this presents no problem because the rotor is made of soft laminated iron. In the operation of the motor shown in FIG. 1a, closing of contacts 19 by mechanical cam 12' energizes windings 16A and 16C for a predetermined angle of rotation of rotor 12. When switch 19 is opened by cam 12', the potential across closely coupled feedback windings 16B and 16D is such that feedback diode 22 is forward biased and is conductive to limit the transient voltage due to the opening of mechanical switch 19 and to return a considerable amount of magnetic energy to the power circuit. The return of energy aids commutation and greatly improves the efficiency of this type of motor. After rotor 12 has rotated approximately one-quarter of a revolution, switch 23 is closed to energize the opposite pair of main windings 17A and 17C, following which feedback diode 24 is rendered conductive to dissipate the energy in feedback windings 17B and 17D.

Figure 1B:
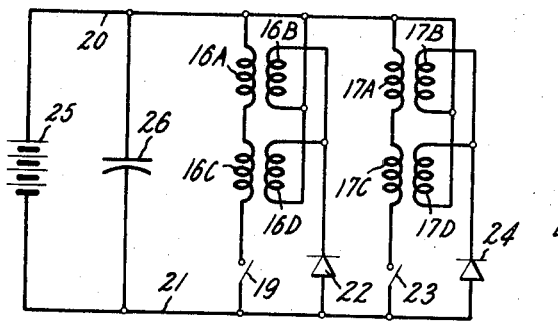
Figure 1C:
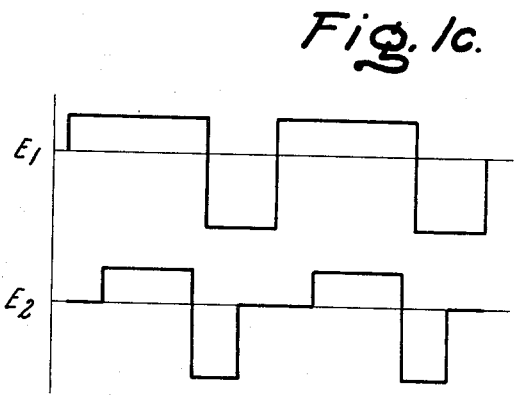
FIG. 1c shows two different voltage wave shapes easily produced by the FIG. 1b circuit.

The FIG. 1b motor control circuit is capable of producing the two idealized voltage wave shapes shown in FIG. 1c. The continuous voltage wave shape $E_1$ and noncontinuous voltage wave shape $E_2$ are obtained depending upon the adjustment of the timing of the opening and closing of switches 19 and 23 with respect to the cam position. To maintain continuous torque, the voltages applied to the opposing sets of stator windings can be overlapping. The application of continuous voltage wave shape $E_1$ to an opposing pair of main stator windings may, depending on the particular operating conditions and physical parameters, result in the production of negative torque. Although it is possible to operate an electric motor with negative torque, the more desirable voltage wave shape $E_2$ is ordinarily used because the generation of positive torque is more easily obtained. The delay between two complete waves is at least equal in angular measurements to the stator pole face length. The turns ratio of the feedback windings is selected to achieve fast flux decay with only a reasonable increase in induced voltage. The parallel feedback winding arrangement shown in FIG. 1a effectively achieves a 2:1 turns ratio, but with good coupling in a manner easily wound when manufacturing. The same or another turns ratio is achieved in a conventional manner by reducing the number of turns and connecting the two feedback windings in series with its respective feedback diode. Although fast flux decay is desirable, in practice the turns ratio is limited by the induced voltage applied to switches 19 and 23, assuming that the mechanical switches are replaced by low cost solid-state switches having low voltage ratings. It is also pointed out that rapid flux decay is permitted without excessive loss by the use of laminated rotor and stator members.

While not ideal, voltage wave shape $E_2$ is a good voltage wave shape for operating a variable reluctance motor. The back electromotive force voltage (back emf) of the motor can be a similar wave shape. Details of the voltage wave shapes in the variable reluctance motor are not critical since both pole area and flux density can change with little loss to match an impressed voltage wave shape. In the conventional electric motor, the applied voltage to operate the motor should have about the same wave shape as the back emf in order to avoid high circulating currents and losses. A reluctance motor, however, has no characteristic back emf and can run on a variety of wave shapes without producing excessive circulating currents and undesirable characteristics. Voltage wave shapes $E_1$ and $E_2$ are easy to produce with a few controlled switches, and operate the motor with good, if not ideal, efficiency. Other applied voltage wave shapes which give more torque are difficult to obtain with a control circuit having only a few control switches.

Figure 1D:
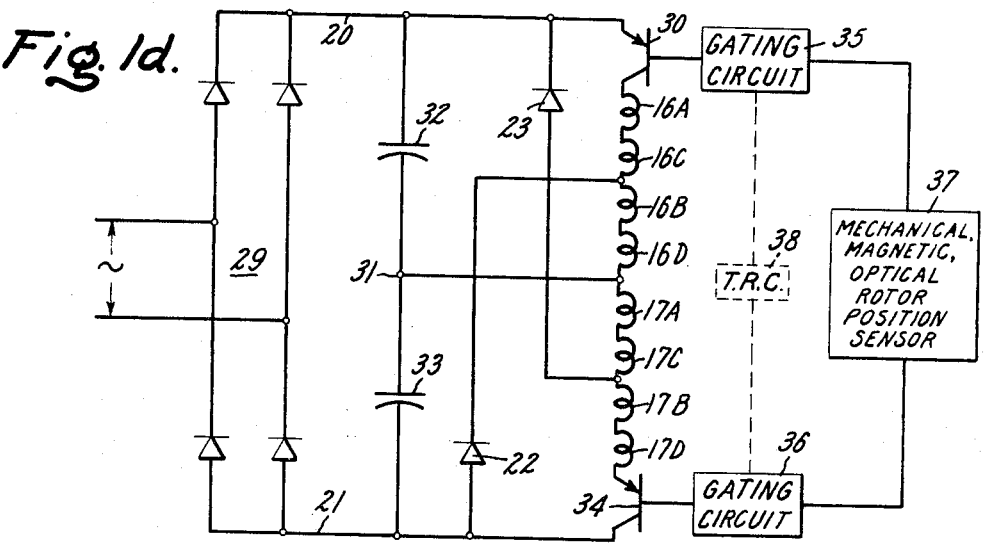
FIG. 1d is a schematic diagram of a modification of the motor control circuit for the FIG. 1a motor using solid state transistor switches that can be operated by time ratio control principles to control the speed of the motor.

The motor control circuit illustrated in FIG. 1d is a modification of the FIG. 1b control circuit and is also compatible for use with the reluctance motor of FIG. 1a. This motor control circuit uses solid-state transistor switches, is powered from a single phase alternating current source, and has provision for time ratio control operation of the switches to change the voltage supply to the motor windings and thereby control the speed. The d-c voltage supply is provided by a full wave diode rectifier 29 connected to an a-c source. As in the previous control circuit, main windings 16A and 16C are connected in series circuit relationship with one another and a first transistor switch 30. In this circuit, however, feedback windings 16B and 16D are connected in series with one another, and are further in series with the two main windings 16A and 16C and transistor 30, the entire series circuit being connected between positive supply terminal 20 and the junction point 31 between two series connected filter and voltage divider capacitors 32 and 33. The other set of main and feedback windings 17A–17D are similarly connected in series with one another and with a second transistor switch 34, the entire series circuit being connected between junction point 31 and negative supply terminal 21. Feedback diodes 22 and 23 are now respectively connected to the junctions between the pair of main windings and feedback windings in the appropriate set of windings and to the opposite supply terminal. To control the turn-on and turn-off of the two transistor switches 30 and 34, gating circuits 35 and 36 are provided and are under the control of a mechanical, magnetic, or optical rotor position sensor 37. Optionally, to achieve speed control, transistor switches 30 and 34 may be turned on and off rapidly during one-quarter of a revolution of the motor to reduce the voltage supply to the motor windings by time ratio control principles. To this end, gating circuits 35 and 36 can be under the control of a time ratio control circuit 38.

In the operation of the motor control circuit of FIG. 1d, it is assumed that rotor position sensor 37 initially actuates transistor gating circuit 35, which supplies a timed turn-on signal to the base electrode of transistor 30, rendering it conductive. The winding utilization is better in this circuit as compared to FIG. 1b, since current flows through all four stator windings 16A–16D into the junction point 31 between capacitors 32 and 33, the voltage at junction point 31 having an average value of half the supply voltage. If voltage control is required, time ratio control circuit 38 modifies the action of gating circuit 35, and during the short intervals of nonconduction of transistor 30, feedback diode 22 becomes forward biased to supply current to these stator windings. When rotor position sensor 37 signals that windings 16A–16D are to be de-energized and the other set of windings 17A–17D are to be energized, feedback diode 22 is also conductive to return stored magnetic energy to the supply terminals to achieve complete flux decay in windings 16A–16D. The other set of stator windings 17A–17D are then energized when gating circuit 36 turns on transistor 34, as previously explained. Feedback diode 23 similarly conducts current to these windings during the nonconducting intervals of time ratio control operation, and returns magnetic energy when transistor 34 is turned off for longer periods of time.

The variable reluctance motor tends to have the voltage-speed characteristics of a d-c series motor, hence reduction of the voltage supply to the motor windings serves effectively to decrease the speed of the motor. Other ways of achieving voltage control are to change the supply voltage in advance of the motor circuit, or to use a voltage control circuit such as a phase controlled rectifier in place of the diode rectifier 29. These voltage control techniques are more suitable for the FIG. 1b motor control circuit. Both motor control circuits use only two controlled switches and two feedback rectifiers, and are compatible in terms of low cost, the voltage wave shape produced, and the variable reluctance motor of FIG. 1a. These motor control circuits provide no way of reversing the current through the opposite pairs of main windings 16A, 16C and 17A, 17C, hence are not suitable for use with a permanent magnet rotor. As was mentioned, the details of voltage wave shapes are not critical in a variable reluctance motor as both pole area and flux density can change with little loss to match an impressed voltage wave shape. Moreover, the direct control of the time of switching by the mechanical cam 12' or rotor position sensor 37 makes the motor function as a d-c motor with no synchronizing problem. The motor energized by a square voltage waveform may not have a desirable torque angle characteristic for operation as an ordinary synchronous motor. The effective circumferential length of stator poles 15a–15, or the winding pitch of the stator windings, is not critical so long as the magnetic fields that are produced and the patterns of decreasing reluctance are overlapping.

Figure 2A:
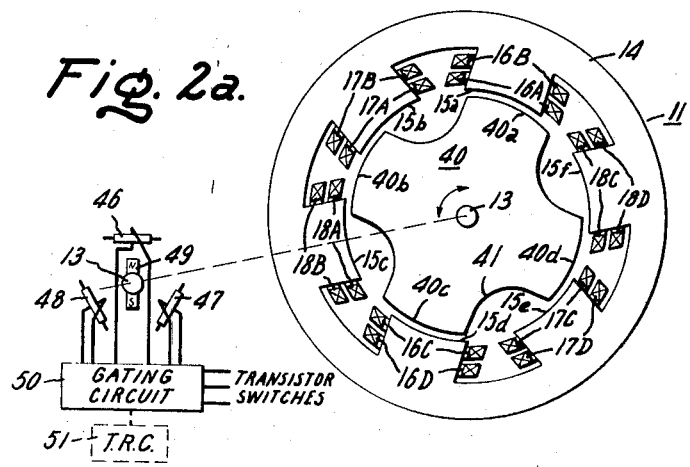
FIG. 2a is a schematic end view of a variable reluctance brushless motor having a symmetrical rotor for reversible operation, in which the motor shaft position is sensed by magnetic Hall generator sensors to switch the solid-state control circuit switches.

The variable reluctance motor illustrated in FIG. 2a has a symmetrical rotor for reversible operation, and has a compatible motor control circuit employing only three controlled switches. This form of the variable reluctance motor has four equally spaced arcuate rotor poles, and six stator poles which are energized in the appropriate direction to produce overlapping clockwise or counterclockwise torque. The dimensions and spacing of the stator and rotor poles are such as to produce overlapping periods of decreasing reluctance in the stator winding magnetic circuits. The three pairs of opposing stator poles 15a–15f are wound with closely coupled bifilar main and feedback windings in the same manner as the motor of FIG. 1a. For this purpose, an additional set of series connected main windings 18A and 18C are provided together with the respective parallel connected feedback windings 18B and 18D. As will be further explained, the compatible motor control circuit of FIG. 2b produces the same square wave shapes as are illustrated in FIG. 1c. Either of voltage wave shapes $E_1$ or $E_2$ can be used, but voltage wave shape $E_2$ is preferred for the same reasons. The symmetrical rotor 40 is essentially circular with four arcuate cutouts or lobes 41 defining the four pole faces 40a–40d. The circumferential length of each rotor pole is greater than the stator pole circumferential length. Assuming that the rotor is rotating, the magnetic flux developed in a particular stator pole exerts pull upon the rotor during the time the rotor is advancing toward but not yet overlapping the stator pole. During the time that the rotor pole overlaps the stator pole, as determined by the difference in their circumferential lengths, the flux in the stator pole is reversed and driven back to zero. To prevent the development of negative torque, no voltages are applied to the stator winding until the rotor pole has advanced in its entirety away from that stator pole. This time period corresponds to the delay between two complete waves of voltage wave shape $E_2$, FIG. 1c. As a condition to generating no negative torque, the stator pole circumferential length should be about equal to the circumferential space between adjacent rotor poles.

Figure 2B:
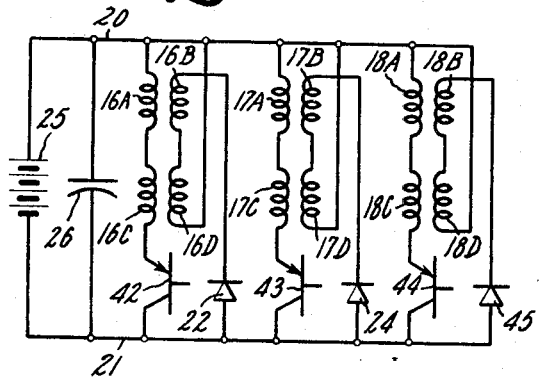
FIG. 2b is a compatible control circuit for the FIG. 2a brushless motor that employs three transistor switches.

The motor control circuit of FIG. 2b is similar to the FIG. 1b control circuit with the exception of the addition of the third set of windings and the replacement of the mechanical switches by transistor switches 42–44. An additional feedback diode 45 is in series with each of the feedback windings 18B and 18D. To provide gating signals for transistors 42–44 that are timed in dependence upon the rotor position, a plurality of magnetic sensors in the form of Hall elements or generators 46–48 are assembled about an extension of the motor shaft 13 and actuated by a permanent magnet 49 secured for rotation with shaft 13. Sensors of this type which operate on the Hall effect principle generate an output voltage between the two output terminals when a magnetic field is applied perpendicular to the face of the Hall element and an energizing control current is applied between the two input terminals, normally aligned with the longitudinal axis of the element. Further information on the Hall generator itself and its utility as a rotor position sensor in a brushless motor can be obtained from the prior art patents, as for example, U.S. Pat. No. 3,159,777 to E.W. Manteuffel, granted Dec. 1, 1964 and assigned to the General Electric Company. Although in the interest of simplicity it may be desirable to use six Hall generators to sense the rotor position at 60° intervals, it is also possible to use the three Hall generators 46–48 spaced at 120° intervals as illustrated, provided that the control current is reversed twice during each revolution of the permanent magnet 49. The output terminals of Hall generators 46–48 are connected to a gating circuit 50 for transistor switches 42–45. If desired, the gating circuit 50 may also be under the control of a time ration control circuit 51 to change the speed of the motor as previously explained.

Figure 2C:
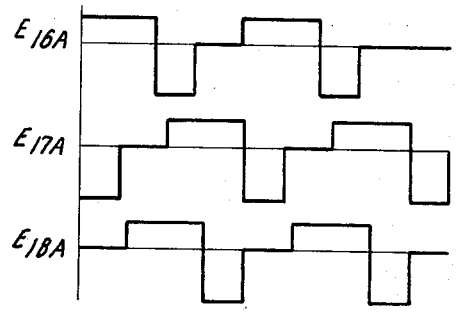
FIG. 2c is a series of three waveform diagrams illustrating the voltage wave shapes generated in the three pairs of stator windings by the FIG. 2b control circuit.

Assuming that the variable reluctance motor is to rotate in a counterclockwise direction, the control circuit of FIG. 2b is operated to produce the square voltage wave shapes $E_{16A}$, $E_{17A}$, and $E_{18A}$ illustrated in FIG. 2c. The wave shapes for the other main stator windings are similar. Square wave gating pulses are supplied from gating circuit 50 to transistor switches 42, 44, and 43 in that sequence, and it will be noted that the gating signals are overlapping. Immediately after removing the gating signal to each transistor, rendering them nonconductive, the feedback diodes 22, 45, and 24 are respectively forward biased to return stored magnetic energy in the main winding magnetic circuits. In the counterclockwise direction of rotation, for the position of the rotor illustrated, stator windings 16A, 18A, and 17A are energized in overlapping sequence to rotate the rotor incrementally through one-sixth of a revolution to move rotor pole 40a adjacent to stator pole 15b. Thereafter the sequence is repeated for windings 16C, 18C, and 17C, and so on. In the manner already explained, the timing of the switching of transistors 42–44 is such that the magnetic flux in a stator pole is built up and exerts useful torque on the rotor, then is returned to the zero or reference level during the time the rotor pole face, because of the difference in length, is rotating adjacent the stator pole face without exerting torque. As before, the delay before again energizing that same pair of windings, to avoid negative torque, is sufficient to allow that rotor pole to move completely off of the stator pole. The sequence of operation to produce clockwise rotation of the rotor is obvious from this description.

Figure 2D:
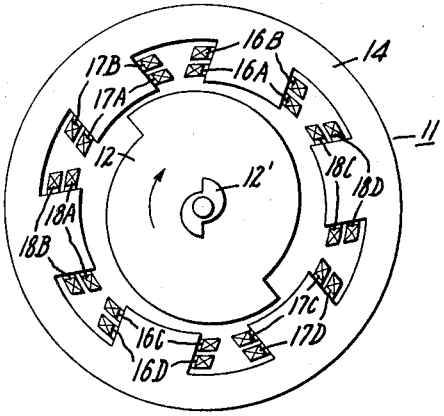
FIG. 2d is a view similar to FIG. 2a of a modified form of the variable reluctance brushless motor having a double spiral rotor for one direction of rotation that can also be used with the FIG. 2b control circuit.

FIG. 2d shows a modification of the motor of FIG. 2a wherein the symmetrical four pole rotor 40 is replaced by the double spiral rotor 12. The modified FIG. 2d motor, therefore, has only one direction of rotation obtained by energizing the stator windings in clockwise sequence, i.e., in the order of 18A, 17A, 16A, etc. It is desirable to overlap the application of voltage so that two of the three opposing pairs of windings are energized at the same time. Thus, at any given time four of the six stator windings are energized and supplying torque to turn the rotor. Voltage wave shape $E_2$, FIG. 1c, is preferred.

The remarks made before with regard to FIGS. 1a–1d as to the advantages of the variable reluctance motor described and the compatibility of the motor control circuit with the motor design apply equally as well to the six stator pole, three control switch motor control circuit forms of the invention shown in FIGS. 2a–2bd. Moreover, although the transistor and diode are uniquely suited for these simple square wave shape circuits, they can be replaced by other solid-state switching devices such as the silicon controlled rectifier, the triac or diac, if controlled for one direction of conduction, the silicon controlled switch, etc. These different controlled semiconductors, as well as some specific time ratio control circuits, are further discussed and illustrated in the Silicon Controlled Rectifier Manual, 4the Edition, available from the Semiconductor Products Department, General Electric Company, Electronics Park, Syracuse, New York, copyright 1967. Transistor gating circuits that can be employed are also described in the General Electric Transistor Manual, copyright 1964, available from the same address.

In summary, relatively simple motor control circuits using a small number of controlled switches to produce simple rectilinear wave shapes have been disclosed in conjunction with suitable reluctance brushless motors that can be operated with good efficiency by these wave shapes. The control circuit has as few as two or three mechanical or semiconductor controlled switches for generating a nonsymmetrical square wave, while the compatible reluctance motor has two or more pairs of bifilar main and feedback windings. The brushless reluctance motor and control circuit combinations are further suitable for variable speed operation by controlling the magnitude of the voltage supplied to the motor.

While the invention has been particularly shown and described with reference to several preferred embodiments thereof, it will be understood by those skilled in the art that the foregoing and other changes in form and details may be made therein without departing from the spirit and scope of the invention.

What I claim as new and desire to secure by Letters Patent of the United States is:

1. A compatible brushless reluctance motor and motor control circuit comprising a stator member supporting a plurality of spaced sets of opposing stator windings for generating overlapping magnetic fields of opposite polarity in torque producing relation to a rotatable magnetically nonpolarized ferromagnetic rotor, circuit means for applying simple substantially rectilinear energizing voltages to each of said sets of stator windings under the control of only one controlled switch device for each set of stator windings, and control means responsive to the instantaneous position of said rotor for rendering conductive each controlled switch device for desired intervals of conduction in a sequence to produce continuous torque to rotate said rotor in a given direction, wherein each set of stator windings comprises pairs of opposing closely coupled main and feedback windings, and said controlled switch device is effectively connected in series circuit relationship with the pair of main windings, and said circuit means further includes a second switch device for each set of stator windings effectively connected in series circuit relationship with each feedback winding to discharge the stored magnetic energy associated with said main windings upon rendering nonconductive the respective controlled switch device.

2. The combination recited in claim 1 wherein all of said switch devices are solid-state devices.

3. The combination recited in claim 1 wherein there are no more than three sets of opposing stator windings equally spaced from one another, and said rotor is shaped as a double spiral, whereby there is a variable air gap between the rotor and stator member.

4. The combination recited in claim 1 wherein there are three sets of equally spaced opposing stator windings, and said rotor is shaped to have four circumferentially oriented arcuate pole faces, whereby there is a constant air gap between the rotor and stator member.

5. A compatible brushless reluctance motor and motor control circuit comprising an annular stator member supporting a plurality of spaced pairs of diametrically opposing closely coupled main and feedback stator windings which generate overlapping magnetic fields of opposite polarity in torque producing relation to a rotatable magnetically nonpolarized ferromagnetic rotor, circuit means for applying substantially square wave energizing voltages to each of said pairs of stator windings including a controlled solid-state switching device connected in series circuit relationship with each pair of main stator windings, and an uncontrolled rectifier effectively connected in series circuit relationship with each feedback winding of each pair of windings with a polarity to be forward biased to discharge stored magnetic energy in the magnetic circuits associated with the respective closely coupled main windings, means for sensing the instantaneous position of said rotor, and control means responsive to said rotor position sensing means for rendering conductive each controlled switch device for desired intervals of conduction in a sequence to produce continuous torque to rotate said rotor in a given direction.

6. The combination recited in claim 8 wherein there are only two pairs of opposing main and feedback windings approximately at right angles to one another, and wherein said circuit means includes a pair of unidirectional voltage power supply terminals between which are connected each pair of main windings and series connected controlled switch device, and also each pair of feedback windings in circuit relationship with the respective uncontrolled rectifier, and said rotor is shaped in a double spiral configuration.

7. The combination recited in claim 5 wherein there are only two pairs of opposing main and feedback windings approximately at right angles to one another, and wherein said circuit means includes a pair of unidirectional voltage power supply terminals between which are connected a pair of voltage divider capacitors, each pair of opposing main and feedback stator windings being connected in series with one another and with the respective controlled switch device between one power supply terminal and the junction of said voltage divider capacitors, the respective uncontrolled rectifier being connected between the other power supply terminal and the junction of said pair of main windings and pair of feedback windings, and said rotor is shaped in a double spiral configuration.

8. The combination recited in claim 7 further including time ratio control means for rapidly turning on and turning off each controlled switch device to vary the magnitude of the voltage applied to said pairs of main stator windings.

9. The combination recited in claim 5 wherein there are only three pairs of opposing main and feedback windings equally spaced from one another, and wherein said circuit means includes a pair of unidirectional voltage power supply terminals between which are connected each pair of main windings and the respective series connected controlled switching device, and also each pair of feedback windings in circuit relationship with the respective uncontrolled rectifier, and said rotor is shaped to have four circumferentially oriented arcuate pole faces.

10. The combination recited in claim 9 further including time ratio control means for rapidly turning on and turning off each controlled switch device to vary the magnitude of the voltage applied to said pairs of main stator windings.

11. The combination recited in claim 5 wherein there are only three pairs of opposing main and feedback windings equally spaced from one another, and wherein said circuit means includes a pair of unidirectional voltage power supply terminals between which are connected each pair of main windings and the respective series connected controlled switching device, and also each pair of feedback windings in circuit relationship with the respective uncontrolled rectifier, and said rotor is shaped in a double spiral configuration.

* * * * *